US007360426B2

(12) United States Patent
Machida et al.

(10) Patent No.: US 7,360,426 B2
(45) Date of Patent: Apr. 22, 2008

(54) ACCELERATION SENSOR

(75) Inventors: Atsushi Machida, Yokohama (JP);
Sumio Yamada, Yokohama (JP);
Hiroshi Tanaka, Yokohama (JP);
Hisanori Aizawa, Yokohama (JP);
Kenji Nagata, Yokohama (JP);
Tsutomu Miyashita, Yokohama (JP);
Hiroshi Ishikawa, Kawasaki (JP)

(73) Assignees: Fujitsu Media Devices Limited, Kanagawa (JP); Fujitsu Limited, Kawasaki (JP)

( * ) Notice: Subject to any disclaimer, the term of this patent is extended or adjusted under 35 U.S.C. 154(b) by 354 days.

(21) Appl. No.: 11/154,801

(22) Filed: Jun. 17, 2005

(65) Prior Publication Data
US 2006/0096379 A1    May 11, 2006

(30) Foreign Application Priority Data
Nov. 9, 2004     (JP) .............................. 2004-324864

(51) Int. Cl.
*G01P 15/12* (2006.01)
(52) U.S. Cl. ................................................ 73/514.33
(58) Field of Classification Search ............. 73/514.33, 73/514.34, 493, 514.29, 514.16, 514.32; 338/2, 5
See application file for complete search history.

(56) References Cited
U.S. PATENT DOCUMENTS 4,829,822 A * 5/1989 Imai et al. ................ 73/514.12
5,081,867 A * 1/1992 Yamada ..................... 73/514.33
5,121,180 A * 6/1992 Beringhause et al. ....... 257/417
5,351,542 A * 10/1994 Ichimura et al. ......... 73/514.33
6,389,899 B1   5/2002 Partridge et al.

FOREIGN PATENT DOCUMENTS

| JP | 11-311631 | 11/1999 |
| JP | 2003-092413 | 3/2003 |
| JP | 2003-279592 | 10/2003 |
| JP | 2004-109114 A | 4/2004 |
| RU | 2 082 124 C1 | 6/1997 |
| WO | 2004/077072 A1 | 9/2004 |

* cited by examiner

*Primary Examiner*—Helen C. Kwok
(74) *Attorney, Agent, or Firm*—Arent Fox, LLP.

(57) ABSTRACT

An acceleration sensor that suppresses fluctuations in the offset voltage and with an enhanced temperature characteristic is provided. The acceleration sensor comprises an weight that is formed in the center of a semiconductor substrate; a frame that is formed at the circumference of the weight; a beam or diaphragm that connects the weight and frame; a detection element that is formed on the beam or diaphragm and which detects bending of the beam or diaphragm that corresponds with the applied acceleration; and a lead that is formed on the beam or diaphragm and which guides the detection output of the detection element to a pad that is provided on the frame, wherein a dummy lead comprising a plurality of dot patterns which are at least electrically independent of the lead formed on the beam or diaphragm is formed on the beam or diaphragm.

3 Claims, 9 Drawing Sheets

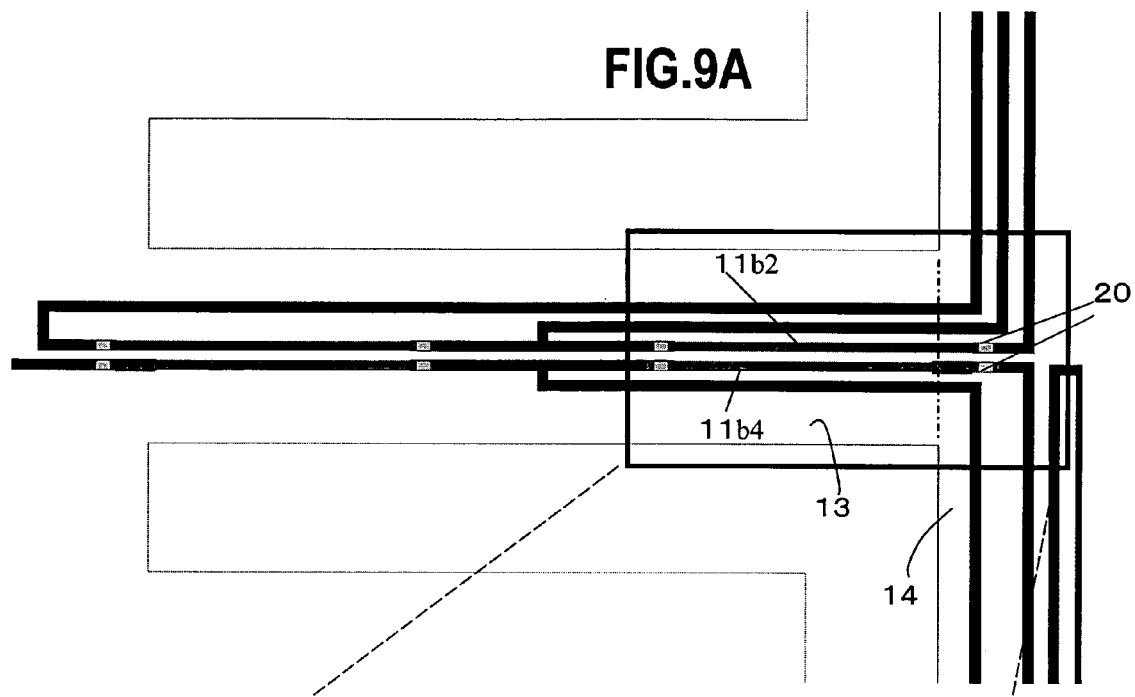
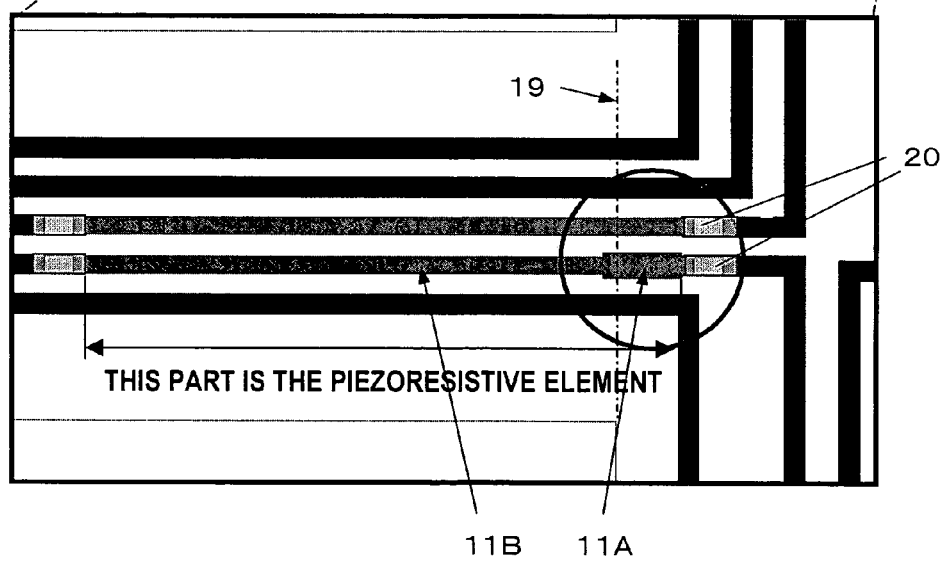

ACCELERATION SENSOR

BACKGROUND OF THE INVENTION

1. Field of the Invention

The present invention relates to an acceleration sensor and, more particularly, to an acceleration sensor in which fluctuations in the temperature-dependent offset voltage are suppressed and which is able to detect the respective acceleration on three axes.

2. Description of the Related Art

Among acceleration-detection semiconductor acceleration sensors that are used in automobiles, ships, toys, and portable terminals, and so forth, acceleration sensors that utilize the piezoresistive effect, the piezoelectric effect, and variations in the electrostatic capacity, and so forth, and which use a variety of detection means have been developed. These acceleration sensors must be miniature and have a high performance.

In addition, the development of sensors that permit multiple-axis detection by means of one chip has progressed and such sensors have already been produced. Among such sensors, the development of multiple-axis acceleration sensors of the piezoresistive type that employ a semiconductor substrate and which can be manufactured by using general semiconductor technology has advanced.

For a general acceleration sensor, a beam structure in which an weight and a frame portion that is disposed to enclose the weight are supported by a plurality of beams that link the frame and weight or a diaphragm structure in which the weight is supported by a thin film are typical. Further, detection in a case where acceleration is applied involves detecting bending that is produced in the beams or diaphragm by means of detection elements.

In a case where piezoresistive elements are formed on the beams or diaphragm as detection elements and acceleration is applied, the weight swings vertically or laterally and stress acts on the beams or diaphragm that support the weight. The acceleration can be grasped as the variation in the resistance of the piezoresistive element in accordance with the bending of the beam caused by the stress.

FIG. 1 is a conceptual view to illustrate a structure of a sensing portion constituting the main element of the acceleration sensor. FIG. 1A is a perspective view of the sensing portion; FIG. 1B is a planar view of the sensing portion, and FIG. 1C is a cross-sectional view of a state where the sensing portion is mounted on a glass substrate.

In FIGS. 1A and 1B, an SOI substrate 10, which is a substrate for fabricating the sensing portion of the acceleration sensor, is constituted comprising a frame 14, piezoresistive elements 11 that are produced on the SOI substrate 10 by means of a process described subsequently, an weight 12 constituting a movable portion of the sensing portion, and a beam 13 that joins the weight 12 and frame portion 14 and supports the movement of the weight 12. In addition, as shown in FIG. 1C, a glass substrate 15 is fixed to the frame 14 to support the beam 13 and hold the weight 12 so as to face one end face in the axial direction of the weight 12.

In this structure, when the weight 12 constituting the movable portion moves, the movement results in a swing or bending of the beam 13 and, hence, there is a variation in the resistance value of the piezoresistive elements 11 that are provided on the beam 13. The variation in the resistance value is detected as an electrical signal output by using a Wheatstone bridge circuit.

Here, in the case of constitution that employs piezoresistive elements as detection elements as shown in FIG. 1, bending of the beam 13 is grasped as a variation in the resistance of the piezoresistive elements and it is necessary to provide draw wiring (leads) that join an external detection circuit and the piezoresistive elements in order to detect the variation in the resistance of the piezoresistive elements.

FIG. 2 is an enlargement of the planar view of FIG. 1B which shows the connected relationship of the piezoresistive elements and the wiring leads as a general constitution.

In FIG. 2, piezoresistive elements are formed and arranged as detection elements on each of four beams 13a to 13d.

In the embodiment shown in FIG. 2, piezoresistive elements 11a1 and 11a2 are formed on a beam 13a, piezoresistive elements 11b1 to 11b4 are formed on a beam 13b, piezoresistive elements 11c1 and 11c2 are formed on a beam 13c, and piezoresistive elements 11d1 to 11d4 are formed on a beam 13d.

External detection portions that are joined via pads 16 to leads connected to the piezoresistive elements 11a1 and 11a2 on the beam 13a and to the piezoresistive elements 11c1 and 11c2 on the beam 13c are connected to a bridge circuit and acceleration in the Y-axis direction is sensed. Similarly, external detection portions that are joined via pads 16 to wiring leads connected to the piezoresistive elements 11b1 and 11b2 on the beam 13b and to the piezoresistive elements 11d3 and 11d4 on the beam 13d are connected to a bridge circuit and acceleration in the X-axis direction is sensed. Further, external detection portions that are joined via pads 16 to wiring leads connected to the piezoresistive elements 11b3 and 11b4 on the beam 13b and to the piezoresistive elements 11d1 and 11d2 on the beam 13d are connected to a bridge circuit and acceleration in the Z-axis direction is sensed.

Here, the problem with an acceleration sensor of the kind described above is the existence of an offset value arising from the temperature characteristic.

That is, a variety of factors may be cited as primary factors arising from the temperature characteristic, namely, variations in the temperature characteristic and resistance of the piezoresistive elements, the internal stress of the wiring, thermal stress, the semiconductor substrate forming the element, differences in the thermal expansion coefficient of the glass substrate or the like that is connected to the semiconductor substrate by anode bonding or similar.

In particular, in cases where leads (wiring) joining the detection elements (piezoresistive elements) 11 and pads 16 do not possess symmetry about the axis of detection (X-axis direction or Y-axis direction) or about the detection elements (piezoresistive elements), the film stress (distribution) caused by the wiring is different for the beams 13a to 13d.

FIG. 3 shows an enlargement of the part of the beam 13a in FIG. 2 to permit an understanding of this aspect. FIG. 4 shows an enlargement of the part of the beam 13b in FIG. 2.

In FIG. 3, supposing that the piezoresistive elements 11a1 and 11b1 that are formed on the beam 13a constitute the center, leads (wiring) disposed on both sides are formed asymmetrically. Meanwhile, in FIG. 4, the leads (wiring) disposed on both sides are formed asymmetrically between the piezoresistive elements 11b1, 11b3, and 11b2 and 11b4 that are formed on the beam 13b.

The film stress balance differs minutely in the vicinity of each piezoresistive element as a result of such an asymmetric target arrangement of the wiring leads on the beams 13a and 13b and there is also a shift in the resistance value. Therefore, the resistance balance of the bridge circuit collapses as a result and the offset voltage increases. Further, the offset voltage similarly increases also with respect to the thermal stress of pure aluminum Al, Al alloy (Al—Si, Al—Cu, or the like) that is used for the wiring.

For this reason, a variety of proposals have been made in order to resolve this problem.

As a first example, in the case of the invention that is shown in Japanese Patent Application Laid Open No. 2003-92413, dummy wiring is formed in addition to the wiring resistors and a wiring pattern on the beam is made symmetrical in the direction of the detection axis and in a direction that is perpendicular to the detection axis.

As a second example, the invention shown in Japanese Patent Application Laid Open No. 2003-279592 adopts a method for separating the placement positions of the piezoresistive elements that are arranged on the beams from the point at which there is a concentration of stress for detecting acceleration in the Z-axis direction. This method adjusts the output by enlarging or reducing the interval between two piezoresistive elements arranged on one beam in the axial direction of the beam.

Further, as a third example, in Japanese Patent Application Laid Open No. H11-311631, the effect on the temperature characteristic as a result of differences in the thermal expansion coefficient between the Si substrate and the anode-bonded glass substrate is a problem from another perspective and, in order to reduce this effect, a groove is formed in the glass substrate to absorb or alleviate the stress that is produced as a result of differences in the thermal expansion coefficient.

As a result of the method that provides the dummy wiring and the method that separates the positions of the piezoresistive elements from the point at which there is a concentration of stress that appear in Japanese Patent Application Laid Open Nos. 2003-92413 and 2003-279592 respectively, there is no increase in the steps when dummy wiring is provided as long as a material that is different from that used for the wiring is not used. Therefore, there is no deterioration in comparison with conventional steps from a perspective of producibility or cost.

However, when the dummy wiring that appears in Japanese Patent Application Laid Open No. 2003-92413 is provided, same must be placed by considering the symmetry and, when the width dimension of the beam is determined, for example, a space equivalent to the interval between the width of the dummy wiring and draw wire (wiring lead) is required and it is difficult to narrow the beam width.

Further, also with regards to the shift in the positions of the piezoresistors that appears in Japanese Patent Application Laid Open No. 2003-279592, when the interval between the piezoresistive elements is narrowed, it is hard to shorten the beam length when the shape of the piezoresistive element is not changed. Conversely, it is possible to extend the beam length but, an excessively long beam length produces large fabrication inconsistencies, which is undesirable. In addition, when the beam length is changed, the amount of deformation with respect to the film stress of the beam and so forth also changes. There is then a need to change the thickness of the film stress and the film deposition method (conditions) and so forth.

In addition, when the interval of the piezoresistive element is enlarged by shifting the piezoresistive element 11 in a direction toward the frame 14 or weight 12 (a shift in an outward direction with respect to the center of the beam), the shifting of the wiring on the frame 14 toward the outside as is to the extent of the shift of the piezoresistive element brings about a change in the wiring layout of the frame. Thereupon, when the frame size is fixed, the space for running the wiring is limited and a variation in the wiring is problematic. Further, the fact that the space in which the wiring can be run is limited means that it is hard to reduce the frame, which is also problematic from a miniaturization perspective.

Further, in the case of a method that forms a groove for alleviating stress in the element fabricated by means of the semiconductor substrate or in the glass substrate according to Japanese Patent Application Laid Open H11-311631, increased costs are unavoidable because a step of forming a groove in the anode-bonding glass substrate is added.

SUMMARY OF THE INVENTION

Therefore, an object of the present invention is to provide an acceleration sensor that resolves the problems of Japanese Patent Application Laid Open Nos. 2003-92413, 2003-279592, and H11-311631, suppresses fluctuations in the offset voltage and which enhances the temperature characteristic.

In addition, an object of the present invention is to provide an acceleration sensor that enhances the temperature characteristic, in particular, the temperature characteristic of the offset voltage while securing freedom of design without greatly changing the element dimensions, fabrication conditions, and so forth in order to improve the above problems.

A first aspect of the acceleration sensor according to the present invention that achieves the above object comprises an weight that is formed in the center of a semiconductor substrate; a frame that is formed at the circumference of the weight; a beam or diaphragm that connects the weight and frame; a detection element that is formed on the beam or diaphragm and which detects bending of the beam or diaphragm that corresponds with the applied acceleration; and a wiring lead that is formed on the beam or diaphragm and which guides the detection output of the detection element to a pad that is provided on the frame, wherein a dummy lead comprising a plurality of dot patterns which are independent of the wiring lead formed on the beam or diaphragm is formed on the beam or diaphragm.

A second aspect of the acceleration sensor according to the present invention that achieves the above object is an acceleration sensor according to the first aspect, wherein the pattern of the dummy lead that is independent of the wiring lead is formed by means of the same steps as the steps for the formation of the wiring lead.

A third aspect of the acceleration sensor according to the present invention that achieves the above object is an acceleration sensor according to the first aspect, wherein a plurality of dot patterns of the dummy lead are disposed on a straight line.

A fourth aspect of the acceleration sensor according to the present invention that achieves the above object is an acceleration sensor, comprising an weight that is formed in the center of a semiconductor substrate; a frame that is formed at the circumference of the weight; a beam or diaphragm that connects the weight and frame; and a piezoresistive element that is formed on the beam or diaphragm and which detects bending of the beam or diaphragm that corresponds with the applied acceleration, wherein the piezoresistive element comprises a first region and a second region of a narrower width than the first region; the first region is formed in a position straddling the boundary between the weight and the beam or diaphragm or the boundary between the frame and the beam or diaphragm; and the second region is formed on the beam or diaphragm.

A fifth aspect of the acceleration sensor according to the present invention that achieves the above object is an acceleration sensor according to the fourth aspect, wherein the boundary position of the first region of the piezoresistive element is aligned so that the proportion of the region positioned on the beam or diaphragm is larger than the region positioned on the weight or frame of the first region.

The present invention is able to provide an acceleration sensor with a superior offset-drift temperature characteristic.

BRIEF DESCRIPTION OF THE DRAWINGS

FIG. 9 illustrates a second embodiment of the present invention;

DESCRIPTION OF THE PREFERRED EMBODIMENTS

Figure 1A:
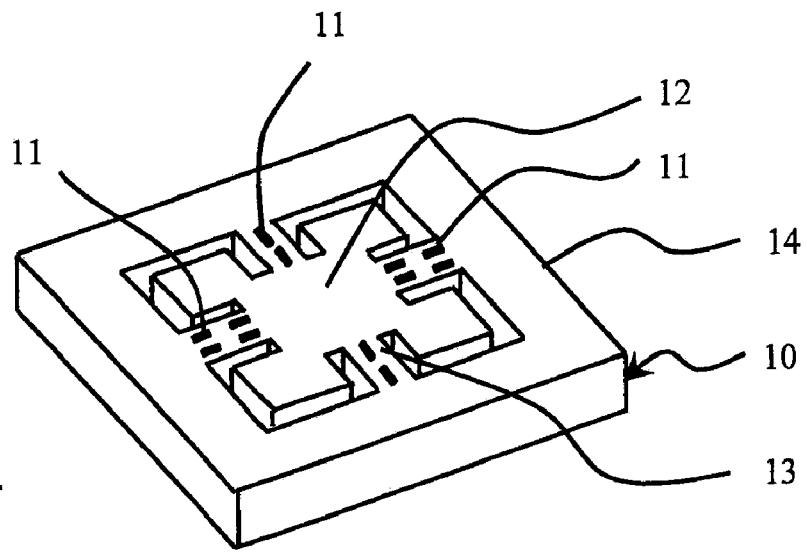
FIG. 1 is a conceptual view to illustrate a structure of the sensing portion constituting the main element of the acceleration sensor.
Figure 1B:
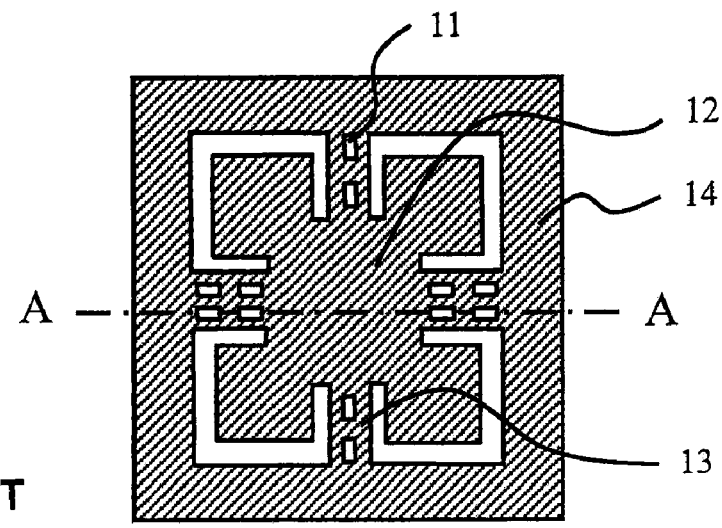
Figure 1C:
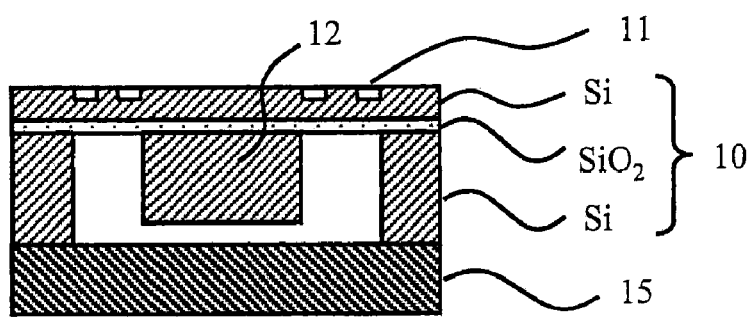

Embodiments of the present invention will be described hereinbelow in accordance with the drawings. Further, the embodiments shown in the drawings illustrate the present invention but the protectional scope of the present invention is not limited to the embodiment.

First Embodiment

Figure 2:
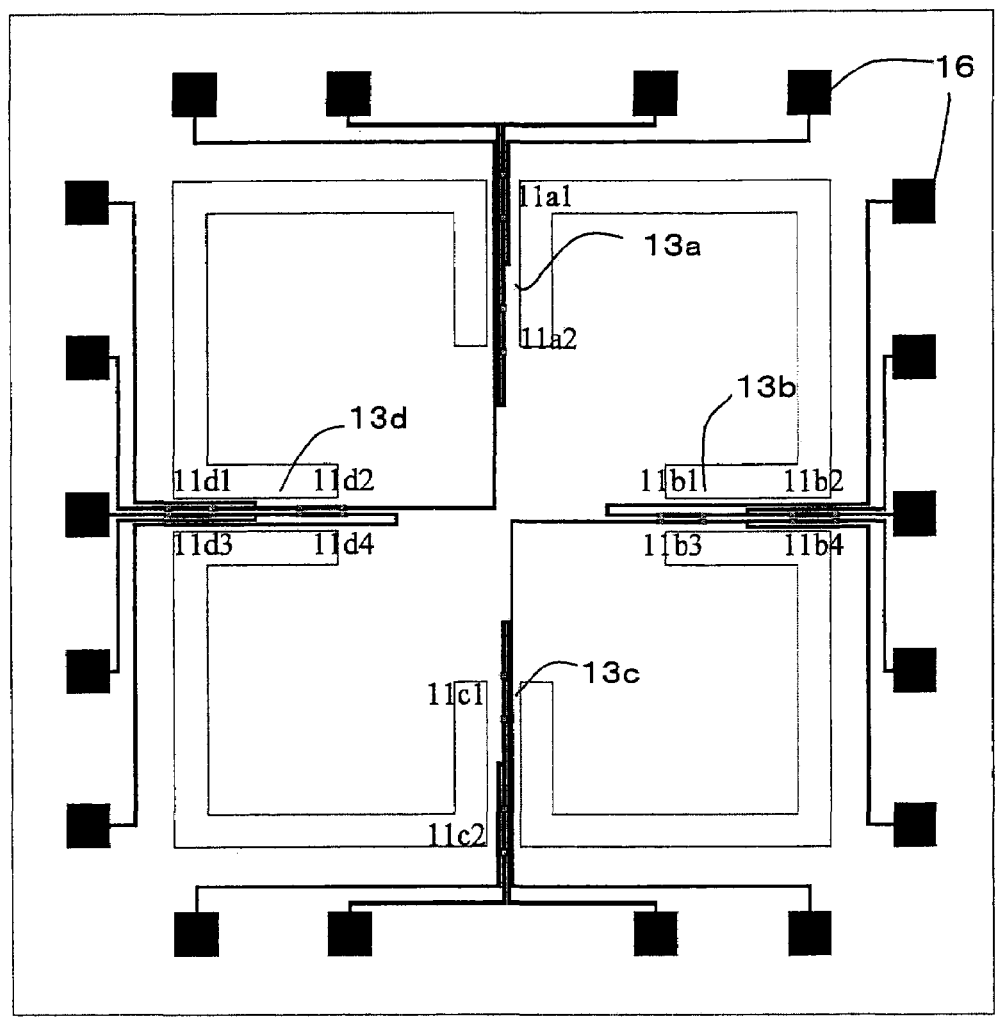
FIG. 2 is an enlargement of the planar view of FIG. 1B which shows the connected relationship of the piezoresistive elements and the leads as a general constitution.
Figure 3:
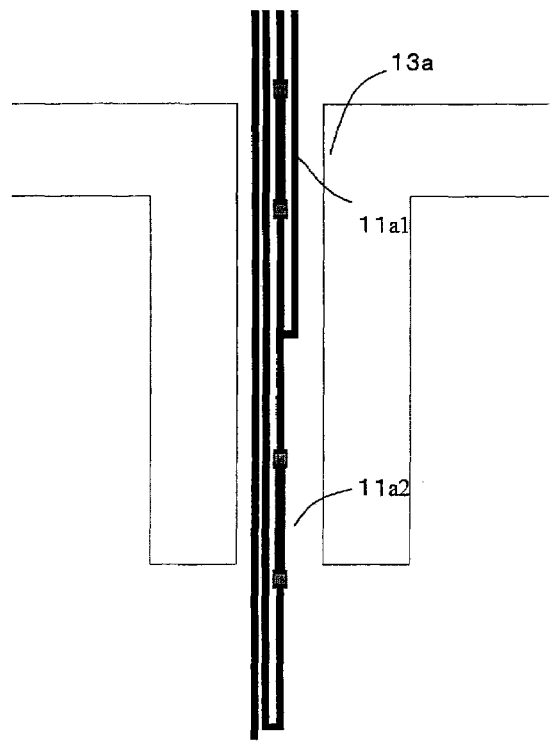
FIG. 3 shows an enlargement of the part of the beam 13a in FIG. 2.
Figure 4:
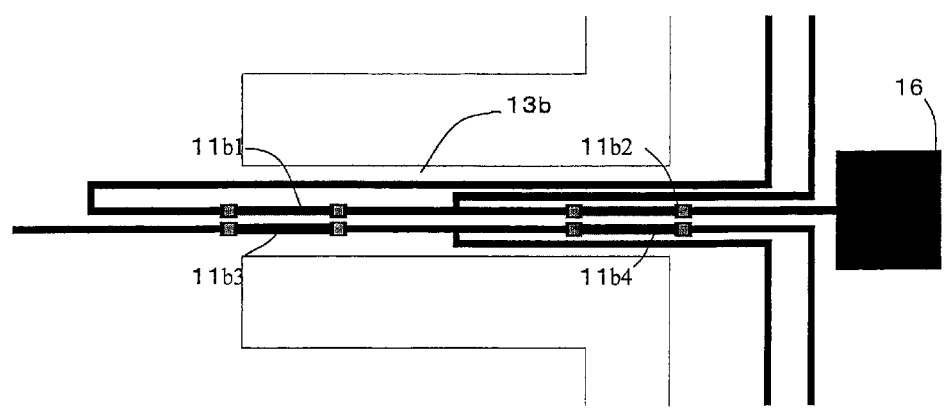
FIG. 4 shows an enlargement of the part of the beam 13b in FIG. 2.
Figure 5A:
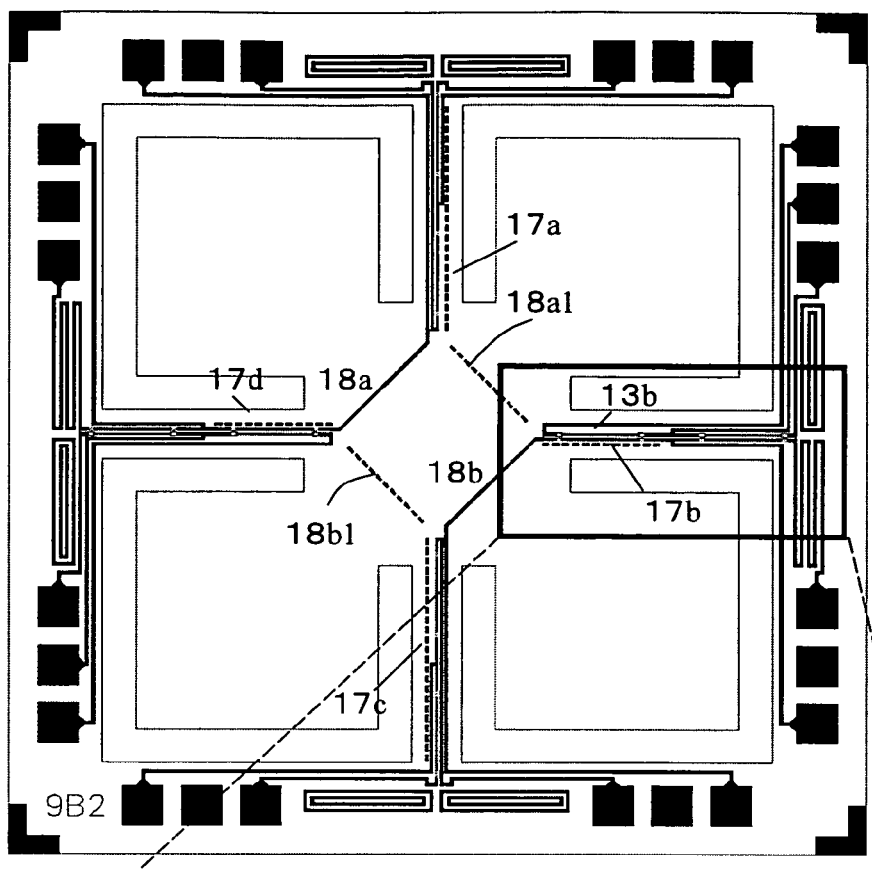
FIG. 5 illustrates a first embodiment of the present invention.
Figure 5B:
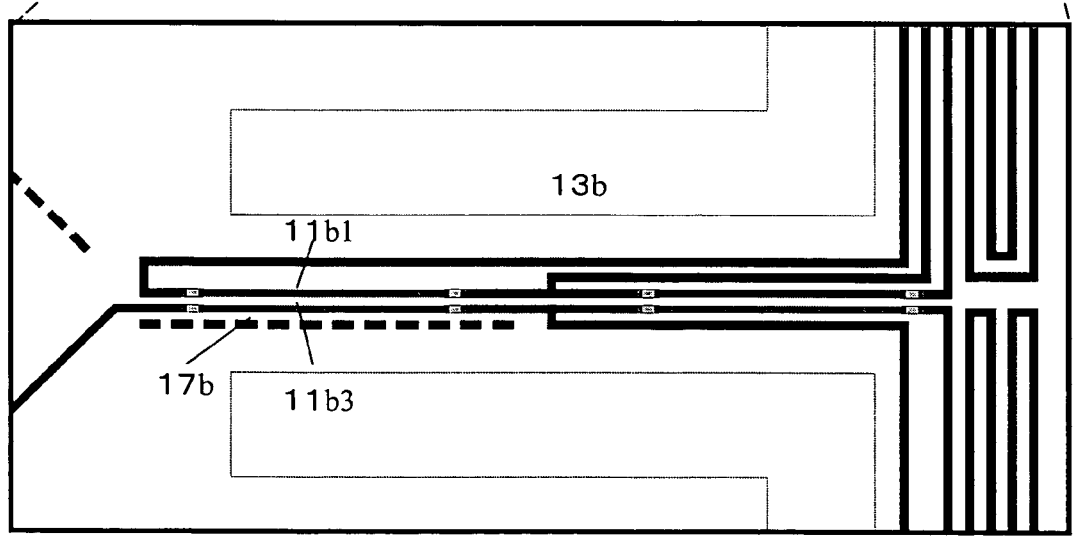

FIG. 5 illustrates the first embodiment of the present invention and FIG. 5A is a planar view that corresponds to FIG. 2. Further, FIG. 5B is an enlarged view of the part of the beam 13b circled by a thick line in FIG. 5A. In FIG. 5, the parts that have the same reference numerals as those in FIG. 2 denote the same parts.

The feature of this embodiment is the fact that the piezoresistive elements 11a1 to 11a2, 11b1 to 11b4, 11c1 to 11c2, 11d1 to 11d4 on the respective beams are provided with leads that are connected to these piezoresistive elements and also dummy leads 17a, 17b, 17c, and 17d.

In addition, in order to establish a balance between the wiring lead 18a that joins the beams 13a and 13d and the wiring lead 18b that joins the beams 13b and 13c, a dummy lead 18a1 is formed between the beams 13a and 13b and a dummy lead 18b1 is formed between the beams 13c and 13d.

In particular, in the case of the present invention, these dummy leads form a plurality of dot shapes as shown in enlarged form in FIG. 5B. Further, for this dot shape, the equivalent length of the dummy leads can be adjusted by adjusting the dot interval, the length of each dot, and the number of dots.

Figure 6:
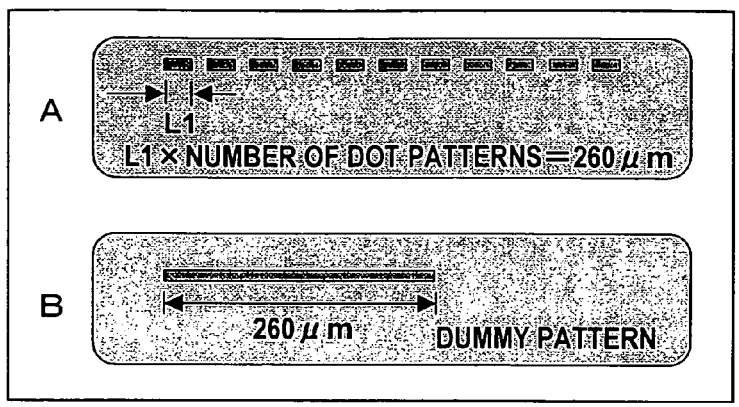
FIG. 6 illustrates dummy leads.

For example, as shown in FIG. 6 that illustrates the dummy leads, when the required dummy-lead pattern length is 260 μm (see FIG. 6B), in cases where the dummy leads are formed on the beams as is, same must be eccentrically located on the beams, that is, arranged skewed in any direction toward the weight 12, the center, or the frame 14. In this case, there is a high probability of beam strain occurring.

On the other hand, according to the present invention, as shown in FIG. 6A, dummy leads with a lead pattern length of 260 μm can be divided into a plurality of dots patterns L1 and arranged evenly on the beams at intervals. The eccentric location of the dummy leads on the beams can thus be avoided.

Figure 7:
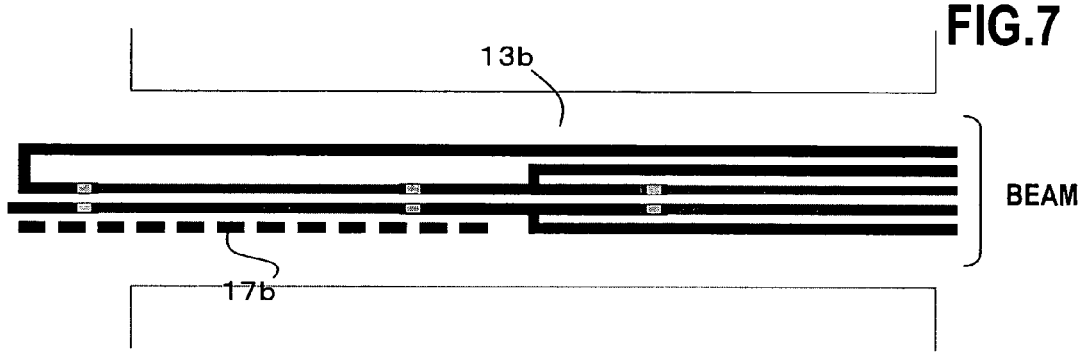
FIG. 7 shows a reproduction of FIG. 5B.
Figure 8:
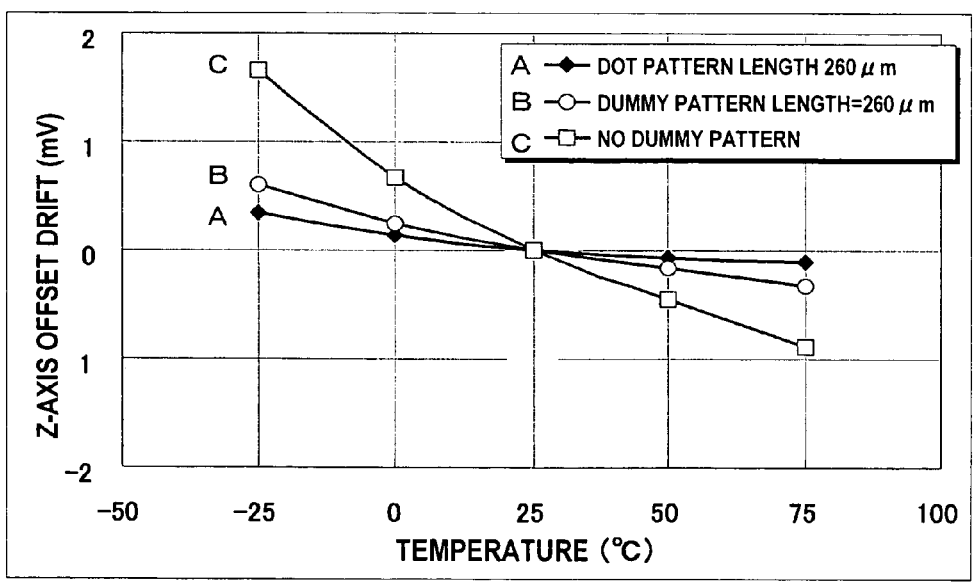
FIG. 8 shows the offset drift characteristic of the Z-axis sensor when the form of a dummy lead 17b that is formed on the beam 13b is changed.

FIGS. 7 and 8 illustrate the results of the first embodiment. FIG. 7 shows a reproduction of FIG. 5B. FIG. 8 shows the offset drift characteristic of the Z-axis sensor when the form of the dummy lead 17b that is formed on the beam 13b is changed.

In FIG. 8, characteristic A represents an embodiment in which the pattern length 260 μm on the beam 13b is divided into dot patterns of a plurality of lengths L1 which are arranged in a scattered configuration, as shown in FIG. 7.

Characteristic B is an example of placement on the beam 13b that does not involve division of the pattern length 260 μm as shown in FIG. 6B. Characteristic C is a characteristic of a case where a dummy pattern is not formed.

All these characteristics are produced by plotting the offset drift (mV) when the temperature is changed by making the temperature 25° C. the reference temperature.

It can be seen from FIG. 8 that the embodiment of the present invention, in which a dummy lead is divided into a plurality of dot patterns each of which is of length L1 which are arranged in a scattered configuration, has a favorable temperature characteristic with respect to comparative examples.

As detailed above, in the case of the first embodiment, it can be seen that, although symmetry of the whole pattern is difficult as a result of the arrangement of piezoresistive elements, the distribution of film stress acting on the beam or diaphragm or the like is enhanced so as to be uniform even in the absence of complete symmetry as shown in FIG. 8 and, as a result, the temperature characteristic is improved.

Here, the formation of dummy leads by means of a plurality of dots can be executed by means of the same steps as those for the formation of wiring leads.

In addition, an example where only piezoresistive elements are used as detection elements in the first embodiment was described. However, the embodiment of the present invention is not limited to such detection elements and can be similarly applied by using piezoresistive elements, for example, as detection elements and the variation in the electrostatic capacity as the detection method, and so forth.

Second Embodiment

FIG. 9 illustrates the second embodiment of the present invention. The second embodiment can also be constituted to independently provide a second embodiment feature that will be described hereinbelow with the precondition that, within the meaning of enhancing the temperature characteristic of the acceleration sensor, the second embodiment be implemented independently from the first embodiment and that same has the constitution of the first embodiment.

The feature of the second embodiment is that the piezoresistive element constituting the detection element is constituted comprising a first region and a second region and the region of the first piezoresistive element is disposed to extend over the boundary between the weight 12 and beam 13 where the stress is concentrated or the boundary between the frame 14 and beam 13. In addition, the width of the first piezoresistive element region is formed larger than the width of the region of the other second piezoresistive element region. As a result, the resistance value of the part of the first piezoresistive element region can be reduced.

That is, the sensitivity in the vicinity of the boundary between the weight 12 and beam 13 where the stress is concentrated or the boundary between the frame 14 and beam 13 can be lowered. Therefore, although the sensitivity in the part of the first piezoresistive element region drops, the fluctuation width of the temperature decreases and, as a result, the temperature characteristic of the whole of the piezoresistive element is improved.

In the embodiment shown in FIG. 9, a first region 11A is positioned to extend over the boundary 19 between the frame 14 and beam 13 and is circled. Further, the piezoresistive element is connected to the lead by means of aluminum wiring 20 as shown in FIG. 9. The piezoresistive element 11b4 that senses the acceleration in the Z-axis direction comprises a first region 11A and a second region 11B and the first region 11A has a width greater than that of the second region 11B (see FIG. 9B).

Figure 10A:
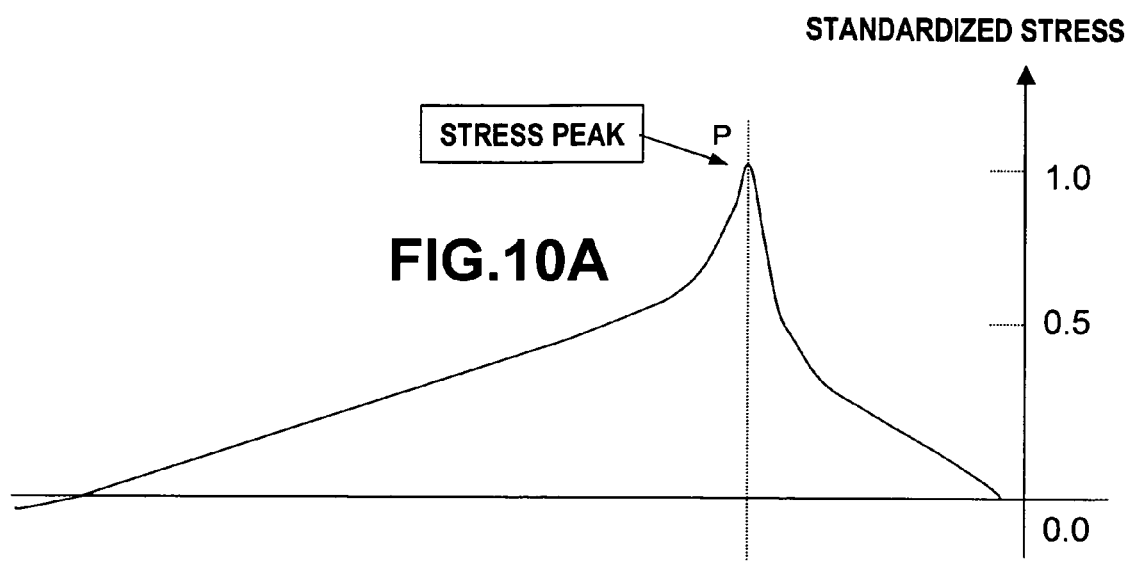
FIG. 10 shows the stress distribution of the embodiment shown in FIG. 9.
Figure 10B:
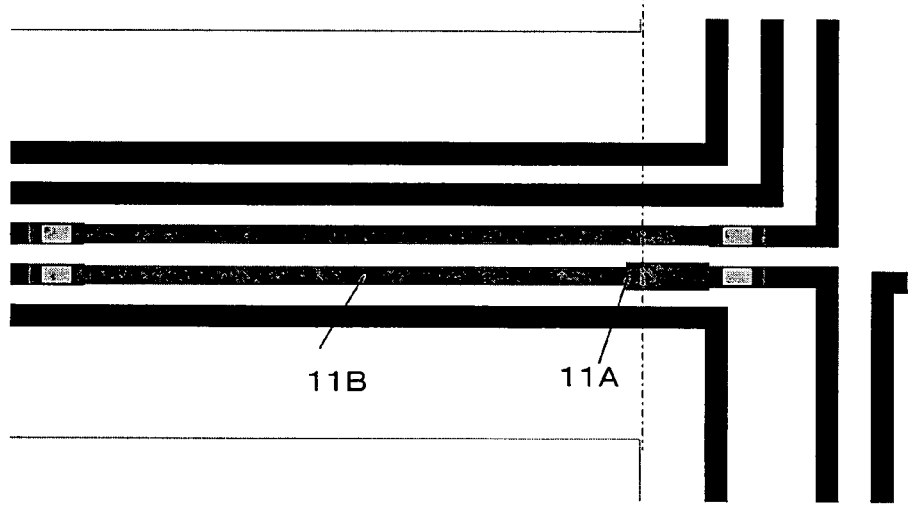

FIG. 10 shows the stress distribution of the embodiment shown in FIG. 9. The stress peak P is shown standardized as 1.

The peak P of the stress is maximum at the boundary 19 of the frame 14 and beam 13, as shown in FIG. 10A. In the region in which this stress is maximum, the piezoresistive element 11b4 forms the first region 11A with a large width. Therefore, the resistance value of the first region part 11A drops and, as a result, the fluctuation width of the sensitivity caused by temperature variations of the piezoresistive element as a whole decreases and the temperature characteristic is enhanced.

Figure 11A:
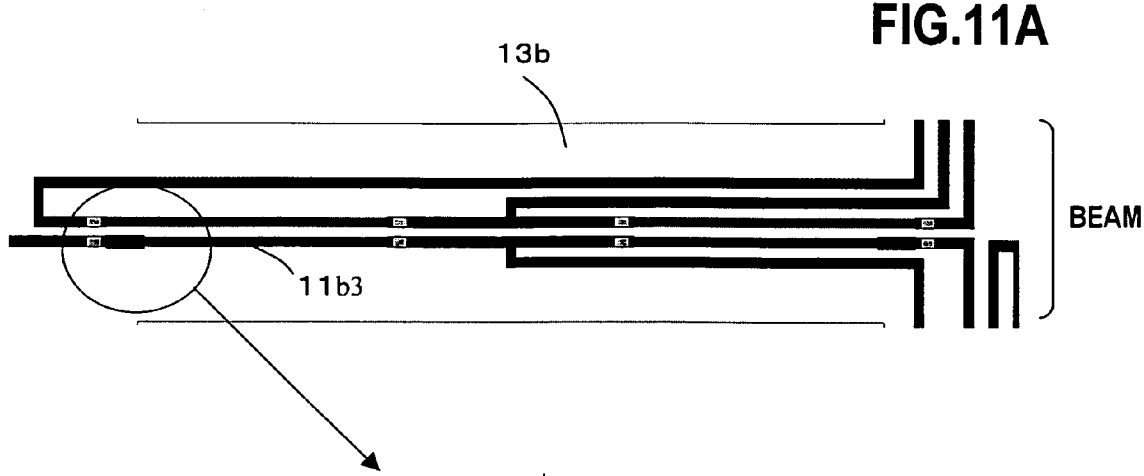
FIG. 11 is an example in which, as the second embodiment, the piezoresistive element 11b3 on the beam 13b is constituted comprising a first region and a second region.

FIG. 11 is a specific example of this second embodiment and constitutes an example in which the piezoresistive element 11b3 on the beam 13b comprises first and second regions. Further, the first region 11A of the piezoresistive element 11b3 is arranged and formed to extend over the boundary 19 between the weight 12 and beam 13.

Figure 11B:
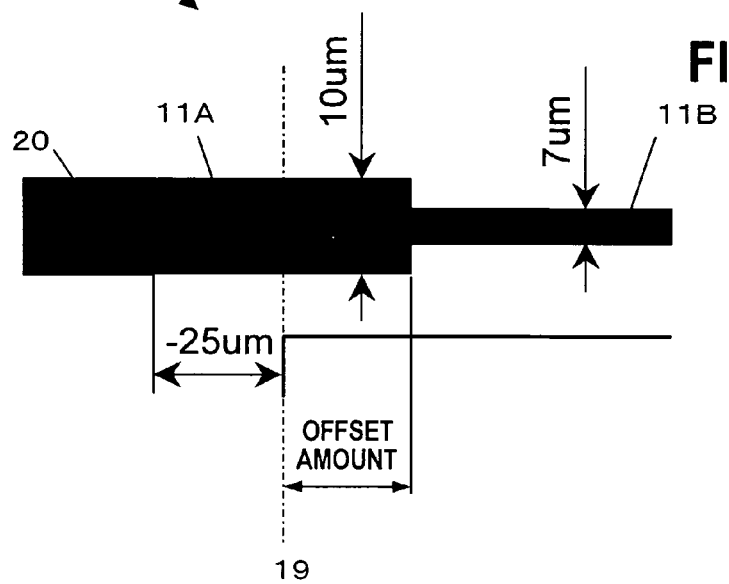

In FIG. 11, as shown enlarged in FIG. 11B, the first region 11A of the piezoresistive element 11b3 is formed to extend over the boundary 19 between the weight 12 and beam 13b.

That is, the first region 11A of the piezoresistive element 11b3 has a predetermined length (displayed as 25 µm: −25 µm in the embodiment) toward the weight 12 when the boundary 19 serves as the reference and is connected to a lead (not shown) on the frame 14 by means of aluminum wiring 20.

In addition, the first region 11A of the piezoresistive element 11b3 has a part with an offset amount on the side of the second region 11B of the piezoresistive element 11b3 when the boundary 19 serves as the reference.

Therefore, in FIG. 11, the length of the first region 11A is produced by adding a predetermined length on the side of the weight 12 when the boundary 19 serves as the reference and the offset amount produced by the extension toward the second region.

Figure 12:
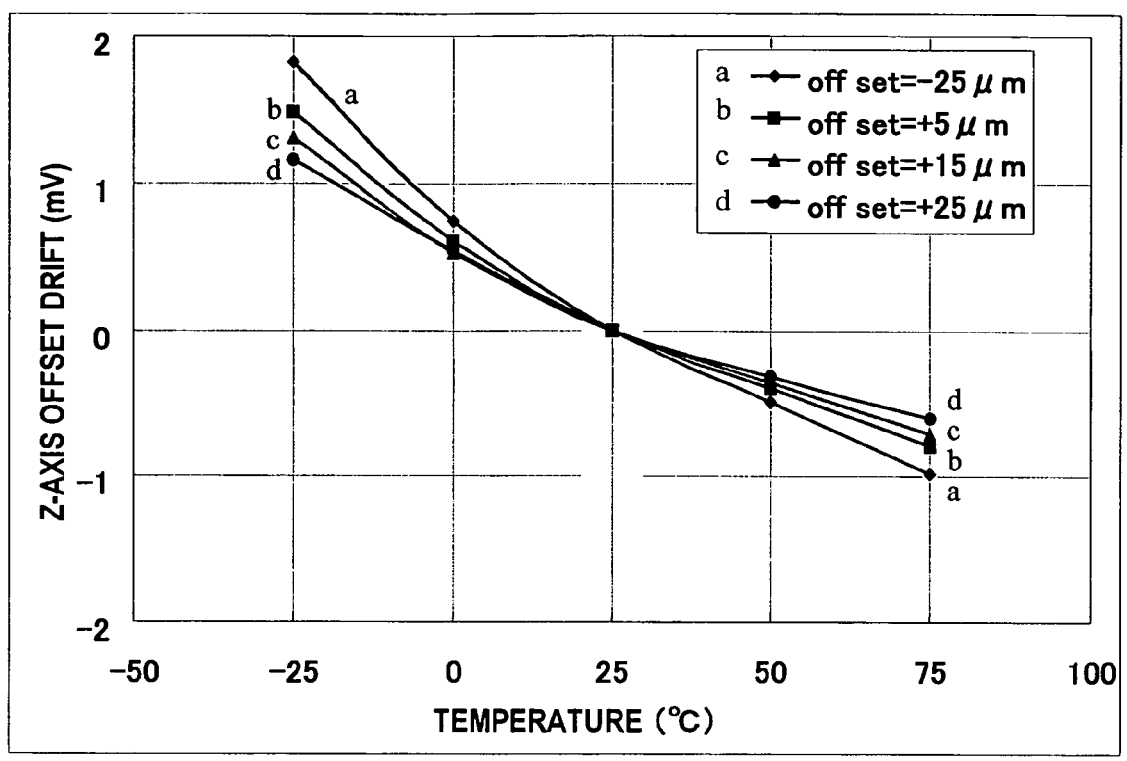
FIG. 12 shows a Z-axis offset drift (mV) for each temperature when the offset amount whereby the first region is extended to the second region in the constitution of FIG. 11 is changed.

Now, supposing that a predetermined length on the side of the weight 12 is (−25 µm) when the boundary 19 serves as the reference and that the width is 10 µm, the results, which are produced through measurement by changing the offset amount of the extension toward the second region (the width in the embodiment is 7 µm), are shown in FIG. 12.

FIG. 12 shows the Z-axis offset drift (mV) of each temperature when changing the offset amount of the extension of the first region 11A of the piezoresistive element 11b3 formed on the beam 13b extending to the second region 11B in the constitution shown in FIG. 11.

The measurement example a in FIG. 12 is an example where the offset amount is −25 µm, that is, in this case, the first region 11A does not exist and the width of the piezoresistive element 11b3 is uniform and is the same as a conventional example.

Measurement examples b to d are examples in which the respective offset amounts are +5, +15 and +25 µm. As can be seen easily from FIG. 12, it can be seen that the temperature fluctuations of the Z-axis offset drift increases as the offset amount when the temperature is changed when the temperature 25° C. serves as the reference is reduced. That is, it can be seen that, by enlarging the region of extension of the first region 11A to the second region 11B when the boundary 19 serves as the reference, more preferable temperature fluctuations can be obtained.

Furthermore, although a description with respect to the Z-axis offset drift was provided in the description of the second embodiment above, it is understood that the offset drift can be adjusted by providing the piezoresistive element with a first region and a second region also on the X axis or Y axis.

To describe the present invention in accordance with the embodiments above, the present invention is able to provide an acceleration sensor with a superior offset-drift temperature characteristic by means of a simple constitution. It is therefore possible to provide an acceleration sensor with superior cost performance and improved reliability.

What is claimed is:

1. An acceleration sensor, comprising:
   a weight that is formed in the center of a semiconductor substrate;
   a frame that is formed at the circumference of the weight;
   a beam that connects the weight and the frame;
   a detection element that is formed on the beam and which detects bending of the beam that corresponds with an applied acceleration; and
   a wiring lead that is formed on the beam and which guides a detection output of the detection element to a pad that is provided on the frame,
   wherein a dummy lead comprising a plurality of dot patterns which are independent of the wiring lead formed on the beam is formed on the beam.

2. The acceleration sensor according to claim 1, wherein the patterns of the dummy lead that is independent of the wiring lead is formed by means of the same steps as the steps for a formation of the wiring lead.

3. The acceleration sensor according to claim 1, wherein the plurality of dot patterns of the dummy lead are disposed on a straight line.

* * * * *